United States Patent
Van Der Schuit

(10) Patent No.: US 10,655,275 B2
(45) Date of Patent: May 19, 2020

(54) DEVICE AND METHOD FOR PRODUCING A LOAD BEARING CABLE, AS WELL AS A LOAD BEARING CABLE

(71) Applicant: Cabin Air Group B.V., Joure (NL)

(72) Inventor: Rinze Jan Van Der Schuit, Oranjewoud (NL)

(73) Assignee: Cabin Air Group B.V., Joure (NL)

( * ) Notice: Subject to any disclaimer, the term of this patent is extended or adjusted under 35 U.S.C. 154(b) by 100 days.

(21) Appl. No.: 15/779,992

(22) PCT Filed: Dec. 6, 2016

(86) PCT No.: PCT/NL2016/050849
§ 371 (c)(1),
(2) Date: May 30, 2018

(87) PCT Pub. No.: WO2017/099589
PCT Pub. Date: Jun. 15, 2017

(65) Prior Publication Data
US 2018/0371692 A1 Dec. 27, 2018

(30) Foreign Application Priority Data
Dec. 7, 2015 (NL) ...................................... 2015920

(51) Int. Cl.
*D07B 1/18* (2006.01)
*D07B 7/06* (2006.01)
(Continued)

(52) U.S. Cl.
CPC ............... *D07B 1/18* (2013.01); *B65H 59/04* (2013.01); *B65H 59/385* (2013.01);
(Continued)

(58) Field of Classification Search
CPC ............ D07B 5/002; D07B 7/165; B66C 1/12
(Continued)

(56) References Cited

U.S. PATENT DOCUMENTS 1,587,856 A * 6/1926 Reed ................... D04D 1/00
57/21
3,533,225 A * 10/1970 Cupler ................... F16G 9/00
57/201
(Continued)

FOREIGN PATENT DOCUMENTS

CN  1197492 A  10/1998
CN  101809225 A  8/2010
(Continued)

OTHER PUBLICATIONS

FibreMax—world's strongest cable: "FibreMax company introduction", Jan. 27, 2015, p. 1 retrieved from https://www.youtube.com/watch?v=D-1ag89j02E (retrieved on May 18, 2018).
(Continued)

*Primary Examiner* — Shaun R Hurley
*Assistant Examiner* — Bao-Thieu L Nguyen
(74) *Attorney, Agent, or Firm* — Rogowski Law LLC

(57) ABSTRACT

A device 100 produces an endless winding cable 101 by winding a yarn 106 around two thimbles 102, 104. The device 100 comprises an elongated guide 110, a carriage 112, a yarn feeder 114, a first thimble holder 116, and a second thimble holder 118. The first thimble holder 116 and the second thimble holder 118 each hold one of the two thimbles 102, 104. The carriage 112 is movable relative to the elongated guide 110. The yarn feeder 114 is connected to the carriage 112, and comprises at least one spool holder 120 for holding a spool 122 with the at least one yarn 106, and an output guide 124 for guiding the at least one yarn 106 to the cable during winding. The yarn feeder 114 comprises at least one yarn brake 126 for controlling a tension of the at least one yarn 106 during winding.

19 Claims, 5 Drawing Sheets

(51) Int. Cl.
*B65H 59/04* (2006.01)
*D07B 7/16* (2006.01)
*B65H 59/38* (2006.01)
*D07B 5/00* (2006.01)

(52) U.S. Cl.
CPC .......... *B65H 59/387* (2013.01); *D07B 5/002* (2013.01); *D07B 7/06* (2013.01); *D07B 7/165* (2013.01); *B65H 2701/31* (2013.01); *D07B 2201/1036* (2013.01); *D07B 2201/1092* (2013.01); *D07B 2205/205* (2013.01); *D07B 2205/2014* (2013.01); *D07B 2205/3007* (2013.01); *D07B 2301/205* (2013.01); *D07B 2301/258* (2013.01); *D07B 2301/559* (2013.01); *D07B 2401/2055* (2013.01); *Y02B 10/30* (2013.01)

(58) Field of Classification Search
USPC .................................................. 57/201, 21
See application file for complete search history.

(56) References Cited

U.S. PATENT DOCUMENTS

| | | | | |
|---|---|---|---|---|
| 3,662,533 | A * | 5/1972 | Snellman | B62D 55/20 57/229 |
| 3,808,078 | A * | 4/1974 | Snellman | B62D 55/253 156/148 |
| 4,257,309 | A * | 3/1981 | Dunahoo | D04G 1/00 24/115 K |
| 4,779,411 | A * | 10/1988 | Kendall | F16G 13/12 59/78 |
| 4,843,807 | A * | 7/1989 | von Danwitz | D07B 7/165 57/201 |
| 5,649,414 | A * | 7/1997 | Rawdon | B66C 1/12 57/201 |
| 7,568,333 | B2 * | 8/2009 | St. Germain | D07B 7/14 57/201 |
| 9,003,757 | B2 * | 4/2015 | Mozsgai | B66C 1/12 57/201 |
| 9,896,799 | B2 * | 2/2018 | Van Der Schuit | D07B 1/145 |
| 9,915,029 | B2 * | 3/2018 | Van Der Schuit | D07B 1/145 |
| 2009/0107573 | A1 | 4/2009 | St. Germain | |
| 2017/0037570 | A1 * | 2/2017 | Van Der Schuit | G02B 6/4296 |
| 2017/0131466 | A1 * | 5/2017 | Van Der Schuit | D07B 1/145 |
| 2018/0334776 | A1 * | 11/2018 | Van Der Schuit | D07B 1/145 |

FOREIGN PATENT DOCUMENTS

| | | |
|---|---|---|
| DE | 3315910 A1 | 11/1984 |
| JP | H0952662 A | 2/1997 |
| JP | 2000239983 A | 9/2000 |
| JP | 2012148877 A | 8/2012 |
| JP | 2014218335 A | 11/2014 |
| JP | 2014218336 A | 11/2014 |
| JP | 2014218337 A | 11/2014 |
| WO | 2008138318 A1 | 11/2008 |
| WO | 2015178769 A1 | 11/2015 |

OTHER PUBLICATIONS

Search Report dated Nov. 29, 2018 in respect of Chinese application 201680071374X.
Notice of Reasons for Rejection dated Dec. 11, 2018 in respect of Japan application 2018-529529.

* cited by examiner

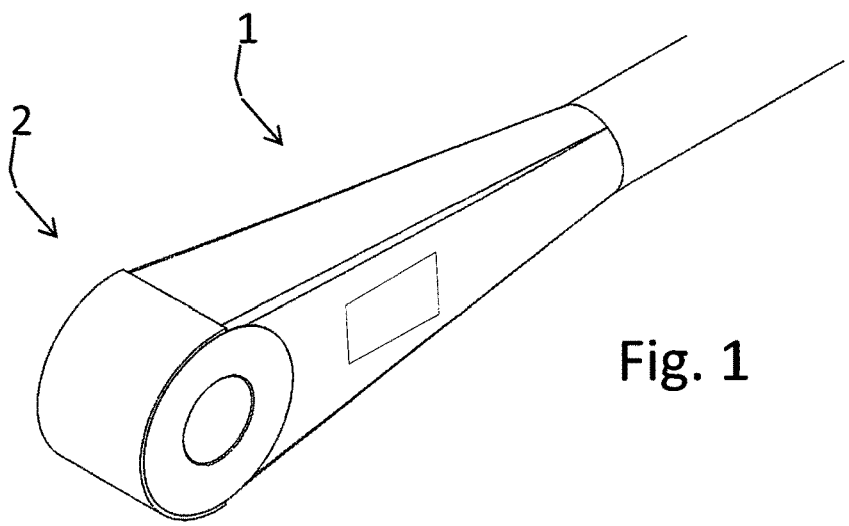
Fig. 1
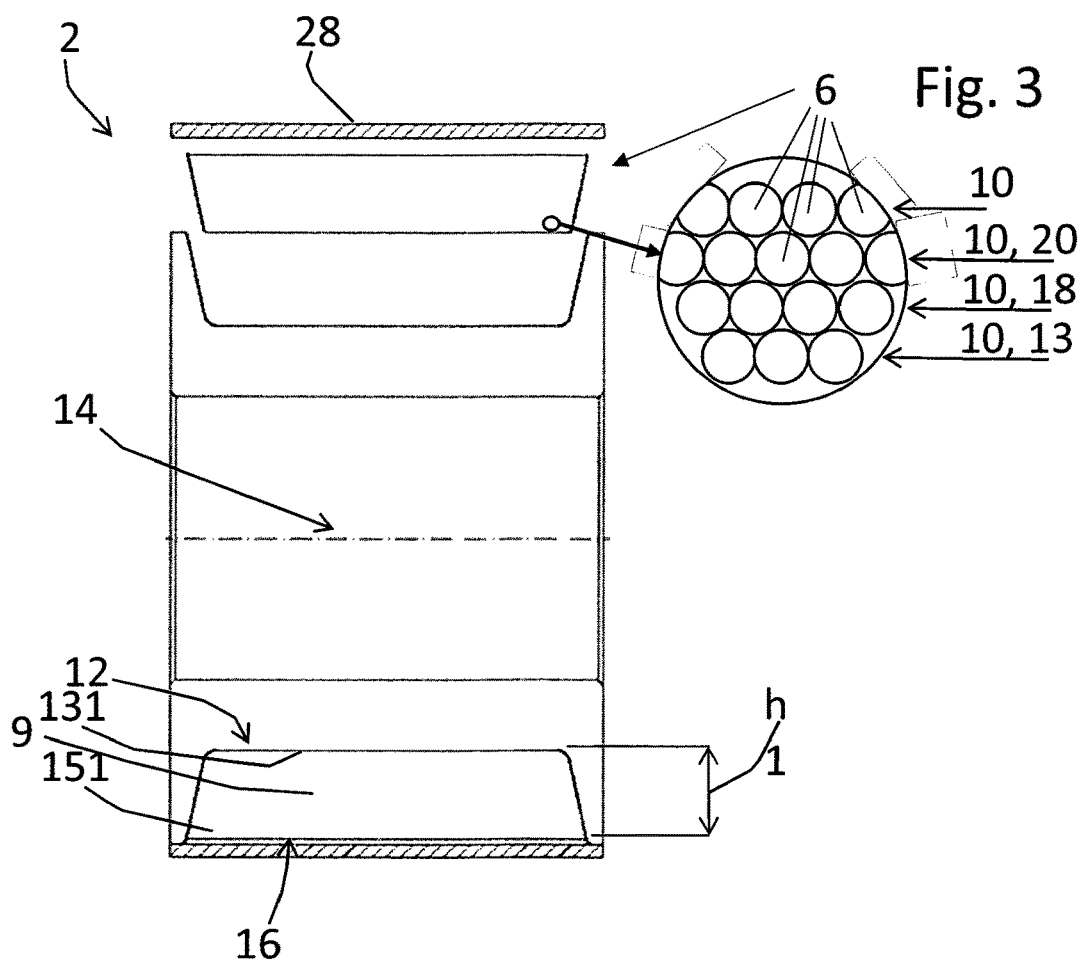
Fig. 2
Fig. 3

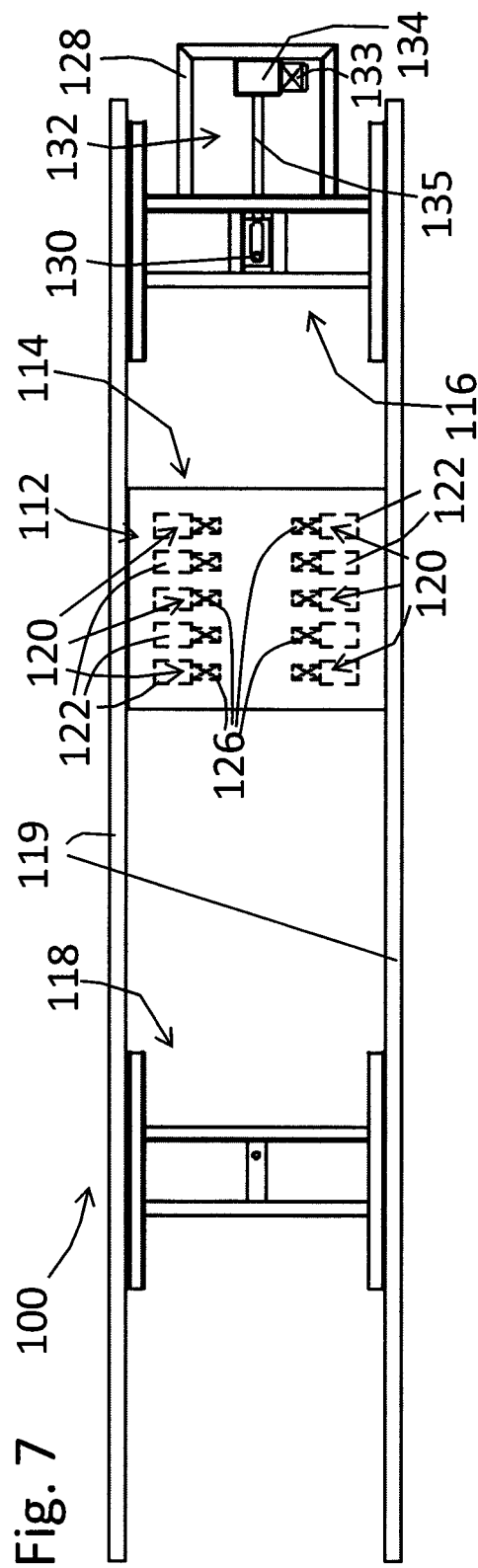

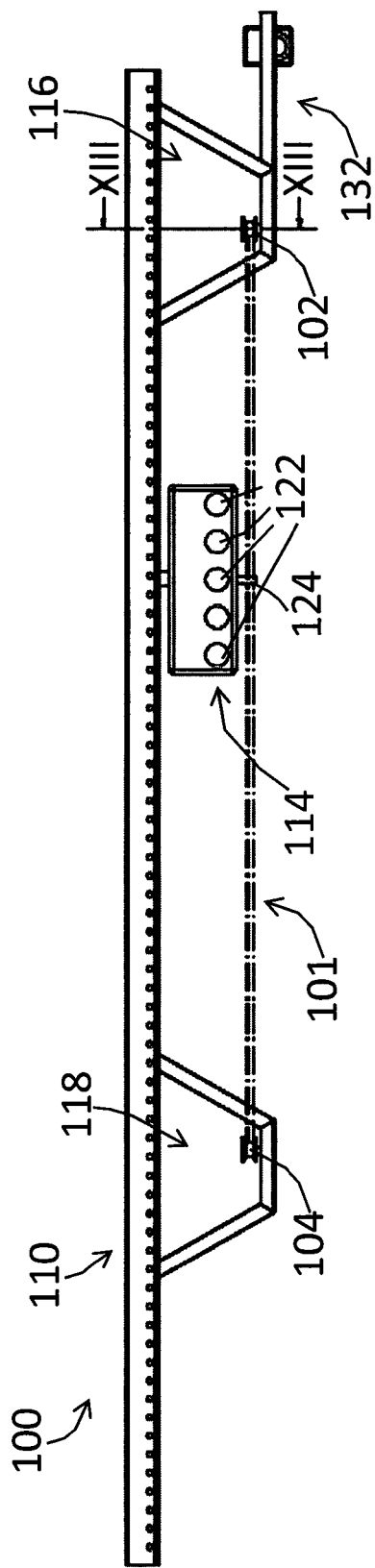
Fig. 11
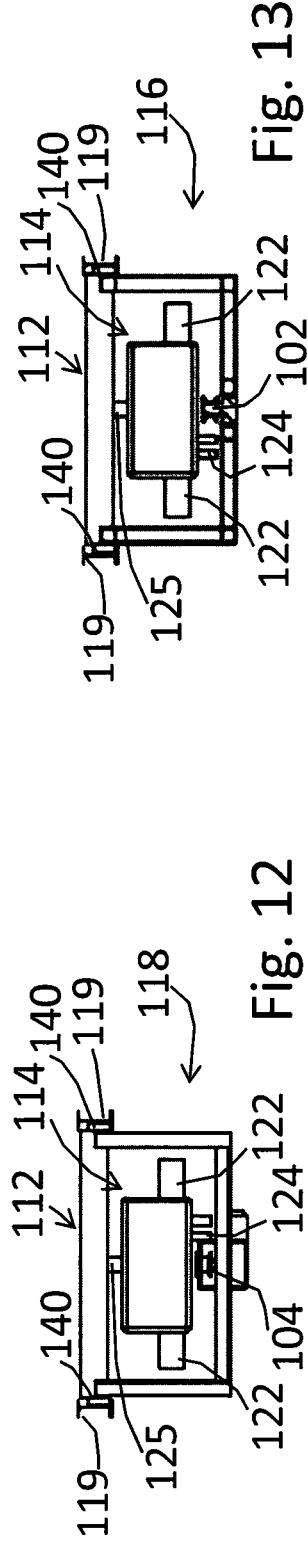
Fig. 12
Fig. 13

DEVICE AND METHOD FOR PRODUCING A LOAD BEARING CABLE, AS WELL AS A LOAD BEARING CABLE

CROSS-REFERENCE TO RELATED APPLICATIONS

This application is a national stage application (under 35 USC § 371) of PCT/NL2016/050849, filed Dec. 6, 2016, which claims benefit of Netherlands application No. 2015920, filed Dec. 7, 2015, the contents of each of which are incorporated by reference herein.

BACKGROUND OF THE INVENTION

A cable produced by a device or method for producing an endless winding cable can be used in different types of industry, including but not limited to offshore, mining and heavy lifting and construction. In offshore, such a cable may be used as a mooring line for ships and structures like a floating oil exploration or production facility, or a floating wind turbine. In mining and heavy lifting such a cable may be used as a pendant for a crane. In construction these cables may be used as a tension member in a bridge or a roof.

A cable produced by a device of this type is known from WO-A1-2005/075286, which discloses a cable that is used as a stay for sailing vessels. This document discloses that fibres/fibers of a thermoplastic material are wound around two fastening eyes with their longitudinal direction running parallel to the longitudinal direction of the stay. The wound fibres/fibers form an endless loop, as it were, comprising a first fibre/fiber strand and a second fibre/fiber strand. As it is an endless loop, the first strand and second strand are in fact one and the same, but in a cross section there appear to be two strands, forming a plastic cable. Due to the thermoplastic material used and because the fastening elements have been incorporated in the loop of plastic fibres/fibers, a stay of this type has good strength properties.

A device and method for producing an endless winding cable is known from a video, published by FibreMax on YouTube on 27 Jan. 2015. The video shows a device elongated guide, a carriage, a yarn feeder, a first thimble holder, and a second thimble holder. The thimble holders are connected to the elongated guide at a distance from one another. The carriage is movable along the elongated guide. The yarn feeder is connected to the carriage, and comprises several spool holders for holding a spool, and an output guide for guiding the yarns to the cable during winding. The output guide is movable relative to the first and second thimble holders for guiding the yarns half a turn around the first thimbles during winding.

The concept of endless winding cable, or rope, is also explained on the page Rope of the English version of Wikipedia as follows. 'Endless winding rope is made by winding single strands of high-performance yarns around two end terminations until the desired break strength or stiffness has been reached. This type of rope (often specified as cable to make the difference between a braided or twined construction) has the advantage of having no construction stretch as is the case with above constructions. Endless winding is pioneered by SmartRigging and FibreMax.'

The known devices and methods for producing an endless winding cable have as a disadvantage that the maximum load of the resulting cable is lower than the sum of the strengths of the individual turns of the yarn.

The invention aims to solve to this problem, or at least to provide an alternative. In particular, the invention aims to provide a device and a method which has an increased break load for the same number of yarn turns.

SUMMARY OF THE INVENTION

A device for producing an endless winding cable by winding at least one yarn around two thimbles that are provided at opposite ends of the cable comprises an elongated guide, a carriage, a yarn feeder, a first thimble holder, and a second thimble holder. The first thimble holder and the second thimble holder are connected to the elongated guide at a distance from each other, and are each designed to hold one of the two thimbles. The elongated guide and the carriage are movably connected to one another to allow a movement of the carriage relative to the elongated guide in a length direction of the elongated guide. The yarn feeder is connected to the carriage, and comprises at least one spool holder for holding a spool with the at least one yarn, and an output guide for guiding the at least one yarn to the cable during winding. The output guide and the first thimble holder, as well as the output guide and the second thimble holder, are movable relative to each other in at least a direction perpendicular to the length direction of the elongated guide for guiding the at least one yarn half a turn around respectively the first thimble and the second thimble during winding. The yarn feeder comprises at least one yarn brake for controlling a tension of the at least one yarn during winding.

The yarn brake for controlling a tension of the at least one yarn during winding results in a cable wherein turns of the at least one yarn have a predetermined amount of tension. This prevents individual yarn turns from becoming overloaded, while other yarn turns are still well under the maximum load, when the cable as a whole is subjected to a load. This invention is based on the insight that in prior art cables individual yarn turns could have more pre stress than others, resulting in such yarn turns becoming individually overloaded and breaking prematurely. This resulted in a lower than expected maximum load of the cable as a whole, as fewer yarn turns contributed to the maximum load of the cable than designed. According to the invention, more yarns remain intact when the cable is subjected to a load, and accordingly the maximum load of the resulting cable is greater.

The device comprises a control, wherein the at least one yarn brake is controllable by the control to adjust, in particular increase, the tension during winding. Adjusting the tension during winding results in a cable wherein yarn turns have a mutually differing predetermined amount of pre tension. This difference may take into account specific properties of the yarns. In particular, some types of fibres/fibers making up yarns have a decreased maximum load when they are compressed. Such compression occurs at the thimbles, where inward layers of yarn turns are compressed by outward layers of yarns that have to transfer their load to the respective thimble via the inward layers of turns. Accordingly, these inward layers will fail prematurely. By controlling the tension, such inward layers can be given a lower pre-tension than outward layers, so that the total tension of the yarn turns in the inward layers is lower than the total tension of the yarn turns in the outward layers when the cable is subjected to a load. This reduces the risk of premature failing of yarn turns in the inward layers due to the combination of tension and compression.

In particular, the control comprises a tension meter for measuring a tension of the at least one yarn at the output guide. A tension meter increases the accuracy of the tension control.

In an embodiment, the control comprises a spool meter for measuring an outer diameter of the at least one spool. This improves the control of the yarn tension.

In an embodiment, the at least one yarn brake is a friction brake, in particular an electro-mechanical brake. Such a brake is well controllable.

In an embodiment, the at least one yarn brake is an eddy current brake. Such a brake does not wear and accordingly the break force does not change over the lifetime of the brake.

In an embodiment, at least one of the first thimble holder and the second thimble holder is detachably connected to the elongated guide, and is connectable to the elongated guide at a plurality of different positions along the elongated guide for adjusting the distance between the two thimbles. This enables producing cables of different lengths with the same device.

In an embodiment, the first thimble holder comprises a main frame and a sub-frame, wherein the main frame is connected to the elongated guide, the sub-frame is designed to hold one of the two thimbles, and the main frame and sub-frame are movably connected to each other for adjusting the distance between the two thimbles. This enables producing cables of different lengths with the same device. It also enables varying the tension in subsequent layers of yarn turns. In particular, at least one of the first thimble holder and the second thimble holder is detachably connected to the elongated guide and the first thimble holder comprises a main frame and a sub-frame. In such an embodiment the detachable connection is intended for a rough determination of the cable length, while the main frame and sub-frame are for fine tuning the cable length.

In particular, the first thimble holder comprises an actuator for moving the main frame and the sub frame with respect to each other. This enables an automated adjustment of the first thimble holder.

In an embodiment, the yarn feeder comprises a plurality of spool holders, each for holding a spool with a yarn. This increases the production speed of the device as compared to a device having one spool holder.

A method for producing an endless winding cable according to the invention comprises the steps of:

positioning a first thimble and a second thimble at a predetermined distance from one another, which distance corresponds to a required cable length, providing at least one yarn, winding the at least one yarn from the first thimble to the second thimble, a half turn around the second thimble, back to the first thimble, and a half turn around the first thimble, repeating the previous step until a predetermined number of layers of yarn turns is provided in both the first thimble and the second thimble, corresponding to a required cable thickness, wherein a tension of the at least one yarn is controlled during winding.

Controlling a tension of the at least one yarn during winding results in a cable wherein turns of the at least one yarn have a predetermined amount of tension. This solves the problem of the prior art in a similar manner as described above in relation to the device.

In an embodiment, the tension of the at least one yarn is greater while winding a subsequent layer of yarn turns than is the tension of the at least one yarn in at least one of the previous layers of yarn turns. Providing a higher tension in a subsequent layer than in a previous layer results in a cable wherein the yarn turns in the subsequent layer have more pre-tension than the yarn turns in the previous layer. Accordingly, when the cable receives a load, the tension in the previous layer is lower. This enables the use of fibres/fibers of which the maximum load decreases when being compressed.

In an embodiment, the tension of the at least one yarn is at least equal, and preferably greater, while winding each subsequent layer of yarn turns, than the tension of the at least one yarn in each previous layer of yarn turns. This embodiment provides a compensation for reduced load under compression of the previous embodiment to all layers of the cable.

In an embodiment, the tension of the at least one yarn is greater while winding a final layer of yarn turns, than the tension of the at least one yarn while winding a first layer of yarn turns.

In an embodiment, the tension of the at least one yarn is controlled during winding by controlling a brake force that is exerted on the at least one yarn during winding. Using a break force is an effective manner of controlling the tension.

In an embodiment, the predetermined distance between the first thimble and the second thimble is decreased after winding a previous layer of yarn turns and the relevant half turn around the first thimble. This is an alternative way of reducing pre tension in a previous layer of yarn turns relative to a subsequent layer of yarn turns.

In an embodiment, the winding of the at least one yarn from the first thimble to the second thimble, a half turn around the second thimble, back to the first thimble, and a half turn around the first thimble, is repeated until one layer of a predetermined plurality of yarn turns is provided in both the first thimble and the second thimble. In this manner, a cable is produced with more yarn turns in one layer than the number of yarns that is used for winding. This results in stronger cable.

Preferably the tension of the at least one yarn is kept constant while winding the one layer of yarn turns. This ensures that all yarn turns in one layer get the same pre tension and thus the same load when the cable is under load.

In an embodiment, the at least one yarn is a plurality of yarns. Accordingly, the method comprises the step of winding the plurality of yarns from the first thimble to the second thimble, a half turn around the second thimble, back to the first thimble, and a half turn around the first thimble. The effect of this feature is that a plurality of yarn turns is provided in the first and second thimble in one method step, which decreases the required time for producing a cable.

In practice, most cables require layers which have each a plurality of yarn turns. This plurality can be produced by either one of, or a combination of, the previous two preferred embodiments, i.e. repeating winding yarn turns for one layer and/or winding more yarn turns in one go.

A cable produced by endless winding of at least one yarn around two thimbles comprises a first thimble and a second thimble, and at least one yarn. The first thimble and the second thimble are provided at opposite ends of the cable. The at least one yarn extends from the first thimble to the second thimble, turns around the second thimble, extends from the second thimble to the first thimble, and turns around the first thimble, such that the at least one yarn forms a turn around the first thimble and the second thimble, and each thimble holds a stack of a plurality of layers of turns of the at least one yarn. Within the context of this document, a turn of a yarn may be either a semi-continuous loop, or a continuous loop. The term semi-continuous loop refers to the fact that the yarn has a finite length with distinct ends, while in a continuous loop a yarn has no ends. So in a semi-continuous loop, the at least one yarn is wound around the first and second thimble a plurality of times, forming a plurality of loops around these thimbles, which is not completely continuous as the ends of the yarn are not connected to each other. A previous layer of turns of the at least one yarn and a subsequent layer of turns of the at least one yarn are defined with respect to a centre/center of the respective thimble, in that the subsequent layer of turns of the at least one yarn is farther away from the centre/center of the respective thimble, than the previous layer of turns of the at least one yarn. Previous and subsequent are relative terms. Accordingly, all layers, except for an outermost layer, will be previous layer with respect to one or more layers that are farther away from the centre/center of the respective thimble. At the same time, all layers except for an innermost layer, will be a subsequent layer with respect to one or more layers that are closer to the centre/center of the respective thimble. A yarn tension is defined as the tension in the at least one yarn in a specific turn. A yarn tension in the subsequent layer of turns of the at least one yarn is greater than the yarn tension in the previous layer of turns of the at least one yarn.

Having a yarn tension in the subsequent layer of turns of the at least one yarn that is greater than the yarn tension in the previous layer of turns of the at least one yarn reduces the risk of premature failing due to compression of the yarn turns in the previous layer, as has been explained in detail in relation to the inventive method and device. The yarn tension is determined either while the cable is not under a load, or while it is under a load, in particular under a relative small load just to stretch the cable.

In an embodiment, the stack of a plurality of layers of turns of the at least one yarn is a stack with at least three layers of turns of the at least one yarn, and the yarn tension in every subsequent layer is at least equal to, preferably higher than, the yarn tension in each of the previous layers. This embodiment provides the compensation for reduced load under compression of the previous embodiment to all layers of the cable.

In an embodiment, the at least one yarn comprises fibres/fibers, in particular carbon fibres/fibers, basalt fibres/fibers, or plastic fibres/fibers, in particular thermoplastic fibres/fibers, more in particular polyamide fibres/fibers, polyester fibres/fibers, polypropylene fibres/fibers, polyethylene fibres/fibers, aramid fibres/fibers, HMPE fibres/fibers, LCAP fibres/fibers, or PBO fibres/fibers. Each of these types of fibres/fibers has its own properties, which makes them suitable for specific uses of the cable.

In an embodiment, the cable comprises a cable cover, which extends around the cable from the first thimble to the second thimble, and bundles all turns of the at least one yarn extending between the first and the second thimble in one compact bundle in a middle section of the cable. This results in a compact cable.

DESCRIPTION OF THE DRAWINGS

The invention, its effects, and advantages will be explained in more detail on the basis of the drawing, in which
FIG. 1 shows an end of a cable according to the invention;
FIG. 2 shows section II-II from FIG. 4;
FIG. 3 shows a detail from FIG. 2;
FIG. 7 shows a top view of the device of FIG. 6;
FIG. 8 shows a side view of the device of FIG. 6;
FIG. 9 shows an end view of the device of FIG. 6;
FIG. 10 shows an end view of the device of FIG. 6, seen from an end opposite to FIG. 9;
FIG. 11 shows the device of FIG. 6 in use;
FIG. 12 shows an end view of the device of FIG. 6 in use;
FIG. 13 shows section XIII-XIII from FIG. 11.

DETAILED DESCRIPTION

Figure 4:
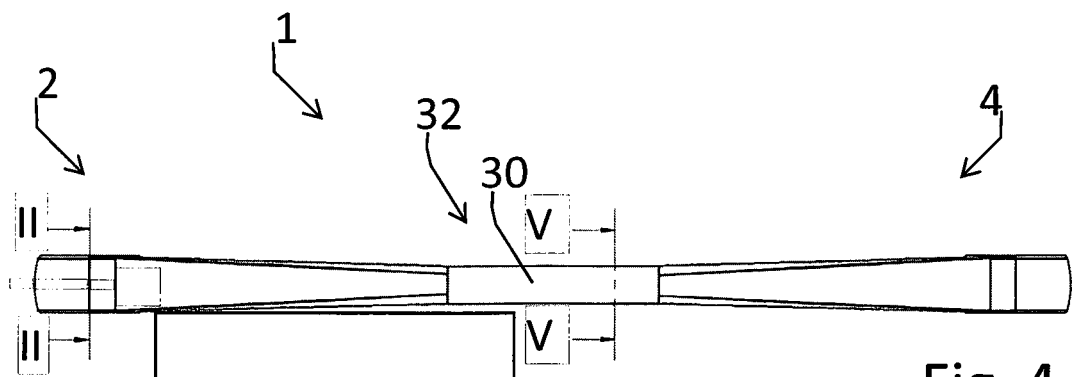
FIG. 4 shows a top view of the cable of FIG. 1.

The FIGS. 1-5 show a cable according to the invention, which is denoted in its entirety by reference number 1. The cable 1 has a first thimble 2 and a second thimble 4, and a plurality of yarns 6. The first 2 and the second 4 thimble are made of stainless steel, and are provided at opposite ends of the cable 1. The plurality of yarns 6 are in this embodiment ten yarns 6 which all extend from the first to the second thimble, turn around the second thimble 4, extend from the second thimble 4 to the first thimble 2, and turn around the first thimble 2. In this manner each of the plurality of yarns 6 forms a semi-continuous loop around the first and second thimbles. This loop is repeated a plurality of times, in this embodiment 950 times. So each of the yarns 6 makes 950 turns, resulting in a total of 9500 turns of yarns 6. This will be explained in more detail later when describing the device and method according to the invention. The yarns 6 consist of fibres/fibers, in this embodiment aramid fibres/fibers with a density of 3220 dTex that are provided with a marine coating. This coating makes the fibres/fibers smoother which results in less fibre-to-fibre wear. These yarns are sold under the name Twaron® D2204 by Teijin Aramid.

FIG. 2 shows that the thimble 2 holds a stack 9 with a plurality of layers 10 of yarn turns 6. This is shown in more detail in FIG. 3. In the upper part of FIG. 2 the stack 9 is shown in an exploded view for clarity. In reality, the stack 9 is held in the first thimble 2 as shown in the lower part of FIG. 2. The second thimble 4 holds layers of the same yarn turns 6 in the same manner and is therefore not shown in detail.

An inside 12 of the stack 9 is defined as a side of a first layer 13 of yarn turns 6 being closest to a centre/center 14 of the thimble 2. An outside 16 of the stack 9 is defined as a side of a last layer 15 of yarn turns 6 being farthest away from the centre/center 14 of the thimble 2. A stack height h is defined as the distance from the inside of the stack 12 to the outside of the stack 16. A previous layer 18 of turns of the at least one yarn 6 and a subsequent layer 20 of turns of the at least one yarn 6 are defined with respect to the centre/center 14 of the first thimble 2, in that the subsequent layer 20 of turns of the at least one yarn 6 is further away from the centre/center 14 of the respective thimble 2, than the previous layer 18 of turns of the at least one yarn 6.

A cable cover 28 extends around the cable 1 from the first thimble 2 to the second thimble 4, and bundles all yarn turns 6 extending between the first and the second thimble 2, 4 in one compact bundle 30 in a middle section 32 of the cable 1. In this embodiment, the cable cover 28 also covers the yarn turns 6 at the thimbles 2, 4.

The turns of the yarn 6 have a specific predetermined tension, which will be explained in more detail in below examples.

A device 100 according to the invention is shown in FIGS. 6-15. The device 100 is designed to produce an endless winding cable 101 by winding at least one yarn 106, in this embodiment ten yarns 106 simultaneously, around two thimbles 102, 104 that are provided at opposite ends of the cable 101. The device 100 comprises an elongated guide 110, a carriage 112, a yarn feeder 114, a first thimble holder 116, and a second thimble holder 118. In this embodiment the elongated guide 110 comprises two elongated I-profiles 119. The elongated guide 110 is suspended from a ceiling of a production facility via supports (not shown) at an interval of approximately 2 meters.

The yarn feeder 114 comprises in this embodiment ten spool holders 120, each designed for holding a spool 122. Each of the ten spools 122 holds a yarn 106. The yarn feeder 114 further comprises an output guide 124 for guiding all ten yarns 106 to the cable 101 during winding (see FIG. 11-13). The output guide 124 of this embodiment comprises rollers for guiding the ten yarns 106, and is in a fixed position relative to the yarn feeder 114. This fixed position is offset from a middle of the yarn feeder 114.

The yarn feeder 114 is connected to the carriage 112, in this embodiment via a pivot 125, which pivot is positioned at the middle of the yarn feeder 114. This enables the yarn feeder 114 to rotate about a vertical axis with respect to the carriage 112. This rotation results in the output guide 124 moving along an arc, in this case a semi-circle, with respect to the elongated guide 110 and thus relative to the first thimble holder 116 and to the second thimble holder 118. This semi-circle includes a movement in a direction perpendicular to the length direction of the elongated guide 110, and enables the output guide 124 to guide the ten yarns 106 half a turn around respectively the first thimble 102 at the first thimble holder 116 and the second thimble 104 at the second thimble holder 118 during winding when the output guide 124 is just beyond the respective one of the two thimbles 102, 104.

The yarn feeder 114 further comprises ten yarn brakes 126, each for one of the spools 122, for controlling a tension of the respective yarn 106 during winding. In this embodiment, the yarn brakes 126 are electro-mechanical brakes. The working and control of the yarn brakes 126 will be explained in more detail in relation to FIGS. 14 and 15.

The first thimble holder 116 and the second thimble holder 118 are connected to the elongated guide 110 at a distance from each other, and are each designed to hold one of the two thimbles 102, 104. In this embodiment, the first thimble holder 116 comprises a main frame 128 and a sub-frame 130, wherein the main frame 128 is connected to the elongated guide 110, the sub-frame 130 is designed to hold one thimble 102, and the main frame 128 and sub-frame 130 are movably connected to each other for adjusting the distance between the two thimbles 102, 104. An actuator 132 is operably connected to the main frame 128 and the sub-frame 130 for moving the main frame 128 and the sub frame 130 with respect to each other. The actuator 132 comprises a spindle motor 133, a gearbox 134, a spindle 135, and a spindle nut (not shown). The spindle motor 133, and gearbox 134 are mounted on the main frame 128. The spindle nut is connected to the sub-frame 130. Rotation of the spindle motor 133 results in a linear movement of the spindle nut and thus the sub-frame 130 relative to the main frame 128.

In this embodiment, both the first thimble holder 116 and the second thimble holder 118 are each detachably connected to the elongated guide 110 via a fastener. This fastener comprises in this embodiment a pin and a hole. The elongated guide 110 comprises the respective holes 136. The holes 136 have a mutual distance of 15 cm. The pins (not shown in the figures) are movably held in the respective thimble holder 116, 118 for connecting the respective thimble holder 116, 118 to the elongated guide 110 at a plurality of different positions along the elongated guide 110, which positions are defined by the holes 136. By retracting the pin, the respective thimble holder 116, 118 is disconnected from the elongated guide 110 and can be moved along the elongated guide 110 for adjusting the distance between the two thimbles 102, 104. The pins are entered into one of the holes 136 when the respective thimble holder 116, 118 is at a required position. This enables producing cables 101 of different lengths with the same device.

The carriage 112 is connected with the elongated guide 110 for a movement of the carriage 112 along the elongated guide 110 in a length direction of the elongated guide 110. The movable connection comprises in this embodiment wheels 140 that run inside the two elongated I-profiles 119 of the elongated guide 110. The carriage 112 further comprises a carriage motor 148 for moving the carriage along the elongated guide 110. The carriage motor 148 is shown only schematically in FIG. 15.

This embodiment of the inventive device comprises a control 150, which comprises an electronic control unit 151. The electronic control unit 151 is operatively connected to the yarn brakes 126 in order to adjust, in particular increase, the tension during winding. The control 150 further comprises ten tension meters 152, and ten spool meters 154, one of each being associated with one of the spools 122 (see also FIG. 14). The control 150 further comprises a user interface 156, and is operatively connected to the carriage motor 148, the spindle motor 133, and a pivot motor 158. The pivot motor 158 is shown only schematically in FIG. 15, and is operatively connected to the carriage 112 and the yarn feeder 114 in order to rotate yarn feeder 114 about pivot 125 with respect to the carriage 112. The connections between the components of the control 150 may be wired, or wireless.

Figure 14:
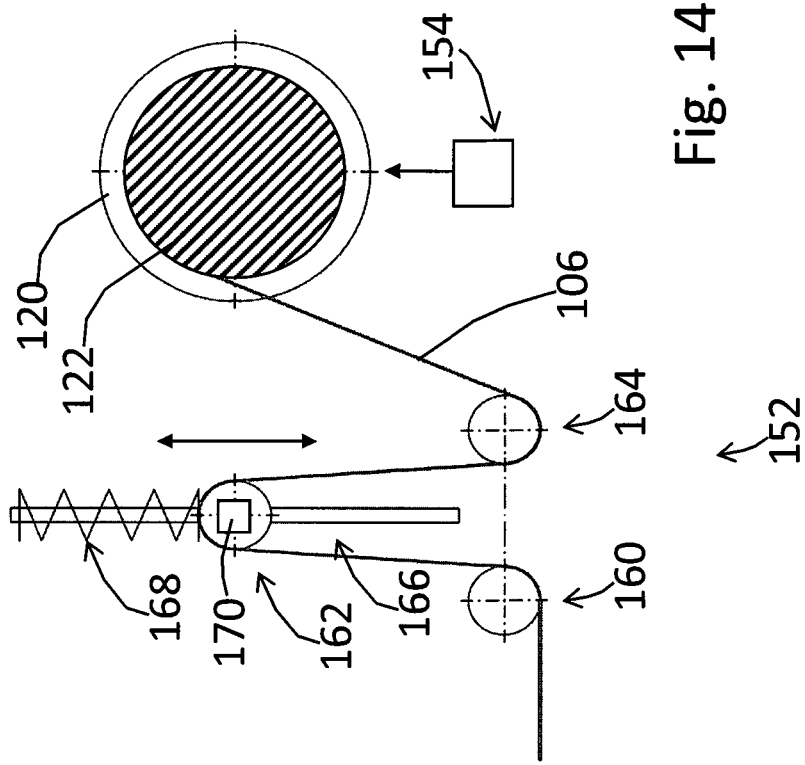
FIG. 14 shows control components of the device of FIG. 6.

The tension meter 152 of this embodiment comprises three guide wheels 160, 162, 164, see FIG. 14. The axles of two outer wheels 160, 164 are mounted at a fixed position on the yarn feeder 114 (not shown in FIG. 14), while the axle of the middle wheel 162 is movably mounted on a rod 166, which rod is mounted at a fixed position on the yarn feeder 114. The rod 166 is positioned offset with respect to the two outer wheels 160, 164, and is oriented on a line that runs between the two outer wheels 160, 164. A helical spring 168 is mounted around the rod 166, and holds the middle wheel 162 under spring force. The respective yarn 106 runs from the spool 122 via the wheels 164, 162, 160 to the output guide 124. Due to the offset position of the middle wheel 162 with respect to the two outer wheels 160, 164, the yarn 106 forms a U-shaped line, running from the first of the two outer wheels 164, via the middle wheel 162, to the second of the two outer wheels 160. The tension meter 152 further comprises a position meter 170 which is connected to the middle guide wheel 162 and provides position information to the electronic control unit 151. This position information corresponds to the actual tension in the respective yarn 106, thanks to the spring action of the helical spring 168.

The spool meter 154 for each spool 122 is in this embodiment a laser with an associated photosensor. The spool meter 154 measures an outer diameter of the associated spool 122. This information is provided to the control unit 151. The control unit 151 controls the yarn brakes 126 in order to determine the required yarn tension during the winding of a specific layer of yarn turns. This yarn tension and its preferred variation will be discussed in relation to the below examples. Here it suffices to say that this yarn tension is computed by the control unit 151 depending on the characteristics of the cable that will be produced and that are input via the user interface 156. The yarn brake 126 is an electromagnetic brake which is controlled precisely by varying the electrical resistance over the electric spool (not shown) of the yarn brake 126. This arrangement results in a torque, which is applied on the spool holder 120 and thus the spool 122. This torque results in a certain tension on the yarn 106. The amount of the tension depends on the actual diameter of the spool 122. Because of this relationship, the diameter is continuously and precisely measured by spool meter 154. Put differently, the required yarn tension and the actual measure spool diameter result in feed forward information on the required yarn brake torque.

The tension meter 152 provides a feedback loop to control unit 151 by measuring the actual yarn tension. On the basis of this feedback information, the control unit 151 can adjust the yarn break torque of the yarn brake 126.

A method for producing an endless winding cable preferably uses a device, such as device 100 which has been described above. For the sake of clarity, the method will be described below in relation to this device. It should be noted however, that any other device or tools may be used within the scope of the invention, as longs as it operates according to a method within the scope of the attached method claims.

The method starts with positioning a first thimble 102 and a second thimble 104 at a predetermined distance from one another, which distance corresponds to a required cable length. Ten yarns 106 are provided on the spools 122, which are held on the spool holder 120 of the yarn feeder 114 as described above. The carriage 112 moves along the elongated guide 110. At the same time, the ten yarns 106 are wound off from the spools 122 while having a precise controlled yarn tension, using yarn brakes 126 under control of control 150. This control 150 also controls the carriage motor 148 and thus the speed of the carriage 112. The carriage 112 moves from the first thimble holder 116 to the second thimble holder 118, thus winding the ten yarns 106 from the first thimble 102 to the second thimble 104. When the carriage arrives at the second thimble holder 118, the control unit 150 controls the pivot motor 158 such that the spool holder 114 makes a half turn. This results in the spool guide 124 making a half turn around the second thimble 104, such that the ten yarns 106 make a first half turn around the second thimble 104. Then the carriage 112 moves back to the first thimble holder 116 so that the ten yarns 106 run back to the first thimble 102, where the control unit 150 again controls the pivot motor 158 such that the spool holder 114 and thus the spool guide 124 make another half turn such, that the spool guide 124 lets the ten yarns 106 make a second half turn around the first thimble 102. These movements of the carriage 112 and spool holder 114 are repeated using the same yarn tension, controlled by control 150, in case that the first and second thimbles 102, 104 are so wide that a multitude of ten yarn turns are provided next to each other in one layer. If only ten yarn turns are provided next to each other in one layer, then the device immediately proceeds to making a next layer.

Once a first layer of yarn turns is provided in both the first thimble and the second thimble 102, 104, preferably the yarn tension is increased as will be explained below in relation to the examples. Then the movements of the carriage 112 and spool holder 114 are repeated until the next layer of yarn turns is provided in the first and second thimble 102, 104. The increasing of the yarn tension, followed by moving the carriage 112 and spool holder 114, is repeated until a predetermined number of layers of yarn turns is provided in both the first thimble 102 and the second thimble 104. This predetermined number of layers of yarn turns corresponds to a required cable thickness.

Figure 5:
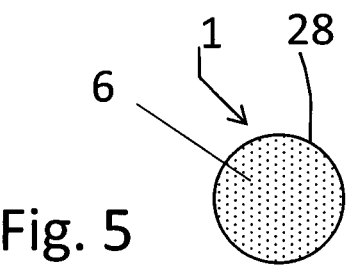
FIG. 5 shows section V-V from FIG. 4.
Figure 6:
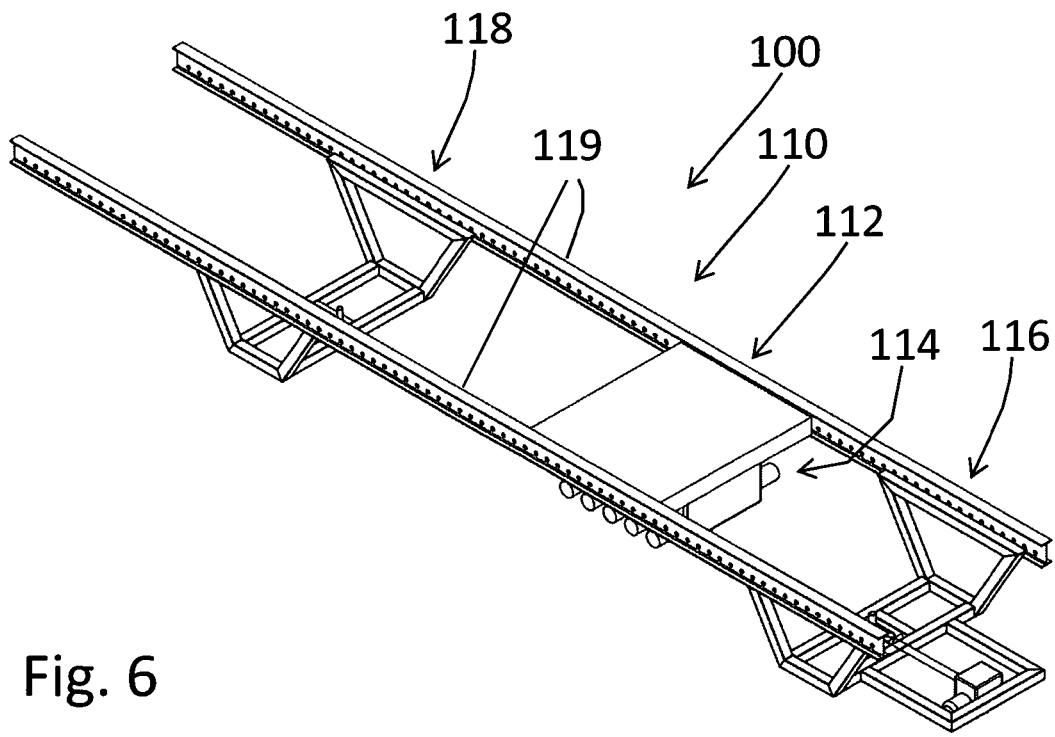
FIG. 6 shows a perspective view of a device according to the invention.
Figure 15:
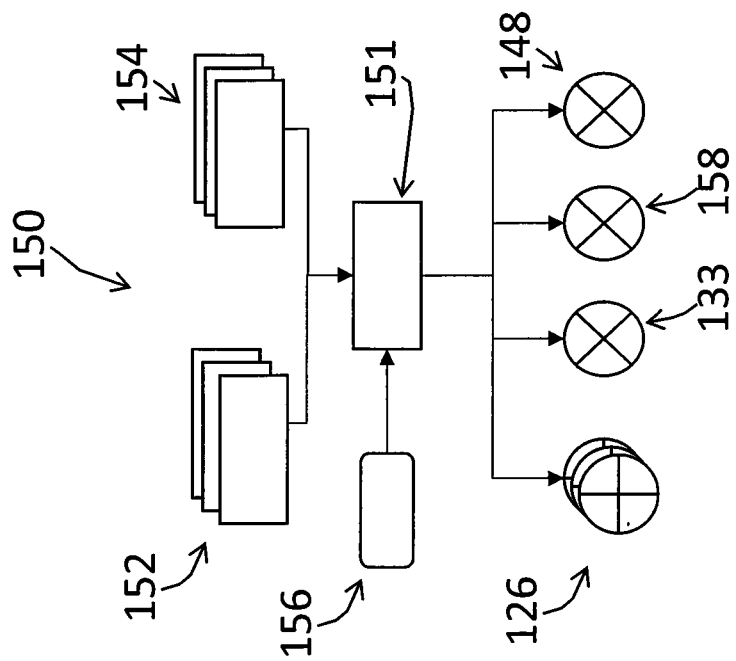
FIG. 15 shows a control circuit for controlling the device of FIG. 6.

In order to finish the cable 101, a cable cover is provided around the turns of the yarn 106, such as the cable cover 28 which is shown in FIGS. 2 and 5. Such a cable cover bundles the turns of the yarn 106 into one compact bundle. Preferably, the same or another cover also covers the yarns which loop around the thimbles 102, 104.

A first example is a cable made of yarns of aramid fibres/fibers with a density of 3220 dTex that are provided with a marine coating. These yarns are sold under the name Twaron® D2204 by Teijin Aramid. The length of the cable is 25 meters. The cable is made of a total of 9500 yarn turns, by winding 10 yarns at a time. There are 30 yarn turns in one layer, and 317 layers. The yarn tension while winding the first layer is 0.5 N. The yarn tension is increased by 0.1 N before winding every next layer. Accordingly the final layer is wound with a tension of about 32.2 N in each yarn.

A second example is a cable made of Twaron® D2204 yarns as well. The length of the cable is 29 meters. The cable is made of a total of 3490 yarn turns, by winding 10 yarns at a time. There are 20 yarn turns in one layer, and 175 layers. The yarn tension while winding the first layer is 0.5 N. The yarn tension is increased by 0.2 N before winding every next layer. Accordingly the last layer is wound with a tension of 35 N in each yarn.

A third example is a cable made of Twaron® D2204 yarns as well. The length of the cable is 45 meters. The cable is made of a total of 8800 yarn turns, by winding 10 yarns at a time. There are 30 yarn turns in one layer, and 293 layers. The yarn tension while winding the first layer is 0.5 N. The yarn tension is increased by 0.15 N before winding every next layer. Accordingly the last layer is wound with a tension of 44 N in each yarn.

A fourth example is a cable made of Dyneema® DM 20 yarns of 1760 dtex. Dyneema® is a trade mark of DSM, the Netherlands. Dyneema fibres/fibers are made of Ultra-High Molecular Weight Polyethylene (UHMwPE), also known as high-modulus polyethylene (HMPE). The length of the cable is 29 meters. The cable is made of a total of 47870 yarn turns, by winding 10 yarns at a time. There are 100 yarn turns in one layer, and 479 layers. The yarn tension while winding the first layer is 0.5 N. The yarn tension is increased by 0.1 N before winding every next layer. Accordingly the last layer is wound with a tension of 48 N in each yarn.

A fifth example is a cable made of yarns of carbon fibres/fibers, in this case called filaments, made by Toho Tenax Europe GmbH. The product name is Tenax® UTS50 F24 24K 1600 tex D. This yarn has 24000 filaments, which corresponds to a nominal linear density of 1600 tex. Tenax® is a trade mark of Toho Tenax. The length of the cable is 12.5 meters. The cable is made of a total of 470 yarn turns, by winding 10 yarns at a time. There are 40 yarn turns in one layer, and 12 layers. The yarn tension while winding the first layer is 0.5 N. The yarn tension is increased by 15 N before winding every next layer. Accordingly the last layer is wound with a tension of 162 N in each yarn. It should be noted that the tension increase for each layer is far greater than for used in winding the thermoplastic fibres/fibers of the previous examples, reflecting the unique tensile properties of carbon fibres/fibers.

Variants of the shown embodiments of the device, method, and cable are well possible within the scope of the attached claims. It is possible to combine one or more features of one embodiment with one or more features of another embodiment. The features of the above described embodiments may be replaced by any other feature within the scope of the attached claims, such as the features described in the following paragraphs.

A cable according to the invention may be made of more or less than ten yarns, such as one yarn, two yarns, or at least five yarns. The total number of yarn turns, i.e. yarn turns per layer and number of layers, depends on the required strength of the cable, and the strength of one individual yarn, as well as the required safety margin. The number of yarn layers in the stack of layers is at least one, but is usually a plurality of layers. The number of layers depends on the required number of yarn turns, and the available width in the thimble resulting in a maximum number of yarn turns in the width direction.

Different types of yarns may be used, such as aramid yarns with a density of 1610 dTex, 6440 dTex, or 4830 dTex, with or without a coating. Instead of using aramid fibres/fibers, one could use other types of plastic fibres/fibers, in particular thermoplastic fibres/fibers, such as polyamide fibres/fibers, polyester fibres/fibers, polypropylene fibres/fibers, polyethylene fibres/fibers, high-modulus polyethylene (HMPE) fibres/fibers, liquid-crystal polymer (LCP) fibres/fibers, or liquid-crystalline polyoxazole (PBO) fibres/fibers. The cable could even comprise other types of yarns, e.g. yarns made of carbon fibres/fibers, a metal, or a natural fibre/fiber, such as basalt fibres/fibers. Yarns of fibres/fibers may consist for 100% of the relevant fibre/fiber type, but could also comprise a small portion of an auxiliary material, e.g. a coating on the fibres/fibers to protect the fibres/fibers against wear and/or environmental influences. As such auxiliary material is only a small portion in weight, and does not contribute to the strength of the cable, the phrase 'yarn consisting of fibres' or 'yarn consisting of fibers' is considered to include embodiments with such auxiliary materials within the context of this document.

The thimble may be made of a plastic material instead of a metal, or of a different metal than stainless steel, including but not limited to different steel alloys, aluminium alloys, magnesium alloys, and titanium.

A device according to the invention has some of the components connected fixedly to each other, instead of connecting the different components of the device detachably and movably to each other as in the shown embodiment. By connecting fixedly one or both thimble holders to the elongated guide, a more simple construction is possible. If one thimble holder is connected fixedly, and the other detachably at different positions, it is still possible to produce cables of different lengths. If both thimble holders are connected fixedly, cables of one length can be produced, or if such an embodiment has a thimble holder with a main frame and sub-frame the cable length can still be varied insofar the movability of the sub-frame relative to the main frame allows. It is further possible to connect the components in an indirect manner to each other, e.g. via the ground or another construction such as a wall or ceiling of a building. As an example, the thimble holders may be connected directly to a ceiling of a building, instead of via the elongated guide.

In an alternative embodiment, the carriage and the yarn feeder are connected to a fixed construction, while the elongated guide and both thimble holders are connected to each other and jointly movable with respect to the carriage and thus with respect to the yarn feeder too.

In a simple embodiment, the spool holder and the output guide may be integrated. The movement of the output guide relative to the first and second thimble holder may be implemented in alternative ways. The output guide may be movable with respect to the yarn feeder, in particular along a line at least partly perpendicular to the length direction of the elongated guide, instead of moving the whole yarn feeder relative to the carriage. In a further alternative embodiment, the first and second thimble holder are movable with respect to the elongated guide, and thus the output guide, perpendicular to the length direction of the elongated guide.

In alternative embodiments of both the method and the device, the predetermined distance between the first thimble and the second thimble is decreased after winding a previous layer of yarns and before winding a subsequent layer of yarn turns. This results in a cable wherein the pre-tension of the yarn turns in each subsequent layer is more than the pre-tension of the yarn turns in each previous layer. The decrease per layer for the cables of the above examples would be in the range of 0.1 to 1 mm. In general, the decrease depends on the length and thickness of the cable and modulus of elasticity of the yarns. Longer cables than shown as examples require a larger decrease. Stiffer cables require less decrease.

Instead of a central control unit, a control device may comprise at least one separate component for controlling the movement of the carriage, the yarn break, and/or the actuator of the first thimble holder.

In an embodiment, the elongated guide comprises one member, or more than two members. In an alternative embodiment, the elongated guide comprises T-shaped members. In an embodiment, the elongated guide comprises a rack which cooperates with a pinion for driving the carriage. In an embodiment, the movable connection between the carriage and the elongated guide comprises a linear slide.

The yarn brake may either engage on the spool, or directly on the yarn. In an embodiment, the yarn brake is integrated with the output guide. In an embodiment, the yarn brake is a hydraulically controlled brake.

In an embodiment, the tension meter comprises further or alternative measuring means, such as a hydraulic or pneumatic plunger instead of a helical spring, and/or contactless measuring means. In an embodiment, the spool meter is a mechanical meter comprising a lever which is held under spring force on the outer surface of the spool.

The invention claimed is:

1. A device for producing an endless winding cable by winding at least one yarn around two thimbles that are provided at opposite ends of the cable, comprising:
    an elongated guide and a carriage movably connected to one another for a movement of the carriage relative to the elongated guide in a length direction of the elongated guide;
    a first thimble holder and a second thimble holder connected to the elongated guide at a distance from one another, with each thimble holder designed to hold one of the two thimbles;
    a yarn feeder connected to the carriage, said yarn feeder comprising at least one spool holder for holding a spool with the at least one yarn, and an output guide for guiding the at least one yarn to the cable during winding;

wherein the output guide and the first thimble holder, as well as the output guide and the second thimble holder, are movable relative to each other in at least a direction perpendicular to the length direction of the elongated guide for guiding the at least one yarn half a turnaround respectively the first one of the two thimbles and the second one of the two thimbles during winding; and wherein the yarn feeder comprises at least one yarn brake for controlling a tension of the at least one yarn while being fed into each yarn layer during winding, further comprising a control, wherein the at least one yarn brake is controllable by the control, and wherein the control is configured to increase tension during winding, such that tension of at least one subsequent yarn layer is greater while winding the at least one subsequent yarn layer than is tension of previous layers of yarn turns.

2. The device according to claim 1, wherein the control comprises a tension meter for measuring a tension of the at least one yarn layer at the output guide while being fed into each yarn layer and/or a spool meter for measuring an outer diameter of the spool.

3. A device for producing an endless winding cable by winding at least one yarn around a first thimble and a second thimble that are provided at opposite ends of the cable, comprising;

an elongated guide;

a carriage movably connected to the elongated guide for movement of the carriage relative to the elongated guide in a length direction of the elongated guide;

a first thimble holder and a second thimble holder connected to the elongated guide at a distance from one another, each designed to hold one of the first and second thimbles, a yarn feeder connected to the carriage, said yarn feeder comprising at least one spool holder for holding a spool with the at least one yarn, and an output guide for guiding the at least one yarn to the cable during winding, wherein the output guide and the first thimble holder, as well as the output guide and the second thimble holder, are movable relative to each other in at least a direction perpendicular to the length direction of the elongated guide for guiding the at least one yarn half a turnaround respectively the first thimble and the second thimble during winding, wherein the yarn feeder comprises at least one yarn brake for controlling a tension of the at least one yarn during winding, wherein the first thimble holder comprises a main frame and a sub-frame, wherein the main frame is connected to the elongated guide, the sub-frame is configured to hold one of the two thimbles, and the main frame and sub-frame are movably connected to one another for adjusting the distance between the first thimble and second thimble, and wherein the first thimble holder comprises an actuator for moving the main frame and the sub-frame with respect to one another, and a control which is operatively connected to the actuator, wherein the control is configured to decrease the distance between the first thimble and the second thimble after winding a previous layer of yarns and the relevant half turn around the first or the second thimble, such that a yarn tension in a subsequent layer of turns of the at least one yarn is higher than a yarn tension in previous layers of turns of the at least one yarn.

4. A device according to claim 1, wherein the at least one yarn brake is a brake selected from the group consisting of: a friction brake, an electro-mechanical brake, and an eddy current brake.

5. A device according to claim 1, wherein at least one of the first thimble holder and the second thimble holder is detachably connected to the elongated guide, and is connectable to the elongated guide at a plurality of different positions along the elongated guide for adjusting the distance between the two thimbles.

6. A method for producing an endless winding cable, comprising the steps of:

positioning a first thimble and a second thimble at a predetermined distance from one another, which distance corresponds to a required cable length, providing at least one yarn, winding the at least one yarn from the first thimble to the second thimble, a half turn around the second thimble, back to the first thimble, and a half turn around the first thimble, repeating the previous step until a predetermined number of layers of yarn turns is provided in both the first thimble and the second thimble, corresponding to a required cable thickness, wherein a tension of the at least one yarn which is fed to a subsequent layer is controlled during winding so that tension of the subsequent layer of yarn turns is greater than is tension of previous layers of yarn turns.

7. A method for producing an endless winding cable, comprising the steps of:

positioning a first thimble and a second thimble at a predetermined distance from one another, which distance corresponds to a required cable length, providing at least one yarn, winding the at least one yarn from the first thimble to the second thimble, a half turn around the second thimble, back to the first thimble, and a half turn around the first thimble, repeating the previous step until a predetermined number of layers of yarn turns is provided in both the first thimble and the second thimble, corresponding to a required cable thickness, and controlling a tension of the at least one yarn during winding wherein the predetermined distance between the first thimble and the second thimble is decreased after winding a previous layer of yarns and a respective half turn around the first or the second thimble, such that a yarn tension in a subsequent layer of turns of the at least one yarn is higher than yarn tension in a previous layer of turns of the at least one yarn.

8. The method according to claim 6, wherein the predetermined number of layers of yarn turns is at least three, and wherein while winding each subsequent layer of yarn turns the tension of such subsequent yarn layer is greater than the tension of the at least one yarn in a previous layer of yarn turns.

9. The method according to claim 6, wherein the tension of the at least one yarn is greater while winding a final layer of yarn turns than the tension of the at least one yarn while winding a first layer of yarn turns.

10. The method according to claim 6, wherein the tension of the at least one yarn is controlled during winding by controlling a brake force that is exerted on the at least one yarn during winding.

11. The method according to claim 6, wherein the winding of the at least one yarn from the first thimble to the second thimble, a half turn around the second thimble, back to the first thimble, and a half turn around the first thimble, is repeated until one layer of a predetermined plurality of yarn turns is provided in both the first thimble and the second thimble, and the tension of the at least one yarn is kept constant while winding the one layer of yarn turns.

12. A cable, comprising:
- a first thimble and a second thimble provided at opposite ends of the cable;
- at least one yarn extending from the first thimble to the second thimble, turning around the second thimble, extending from the second thimble to the first thimble, and turning around the first thimble, such that the at least one yarn forms a turn around the first thimble and the second thimble, and each thimble holds a stack of a plurality of layers of turns of the at least one yarn, wherein
- a previous layer of turns of the at least one yarn and a subsequent layer of turns of the at least one yarn are defined with respect to a center of a respective one of the first thimble or the second thimble, and the subsequent layer of turns of the at least one yarn is further away from the center of the respective thimble than the previous layer of turns of the at least one yarn, and the previous layer of turns of the at least one yarn has a first yarn tension and the subsequent layer of turns of the at least one yarn has a second yarn tension, wherein the second yarn tension is higher than the first yarn tension.

13. The cable according to claim 12, wherein the yarn tension in a subsequent layer is higher than the yarn tension in the previous layers of yarn turns.

14. The cable according to claim 12, wherein the at least one yarn comprises fibers selected from the group consisting of: carbon fibers, basalt fibers, plastic fibers, polyamide fibers, polyester fibers, polypropylene fibers, polyethylene fibers, aramid fibers, high-modulus polyethylene (HMPE) fibers, liquid-crystal polymer (LCP) fibers, and liquid-crystalline polyoxazole (PBO) fibers.

15. The cable according to claim 12, further comprising a cable cover which extends around the cable from the first thimble to the second thimble, and bundles all turns of the at least one yarn extending between the first and the second thimble in one compact bundle in a middle section of the cable.

16. The method according to claim 7, wherein while winding each subsequent layer of yarn turns the tension of the at least one yarn is greater than the tension of the at least one yarn in a previous layer of yarn turns.

17. The method according to claim 7, wherein the tension of the at least one yarn is higher while winding a final layer of yarn turns than the tension of the at least one yarn while winding a first layer of yarn turns.

18. A device according to claim 3, wherein the at least one yarn brake is a brake selected from the group consisting of: a friction brake, an electro-mechanical brake, and an eddy current brake.

19. A device according to claim 3, wherein at least one of the first thimble holder and the second thimble holder is detachably connected to the elongated guide and is connectable to the elongated guide at a plurality of different positions along the elongated guide for adjusting the distance between the two thimbles.

* * * * *